(No Model.)
T. WALKER.
STUFFING BOX FOR STEAM ENGINES.
No. 255,060. Patented Mar. 14, 1882.
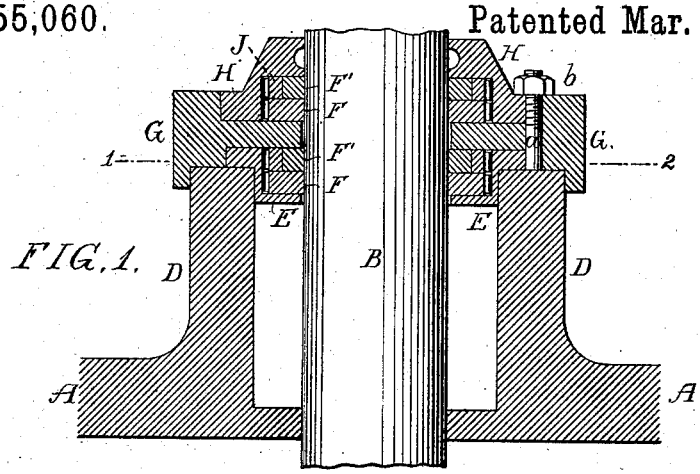
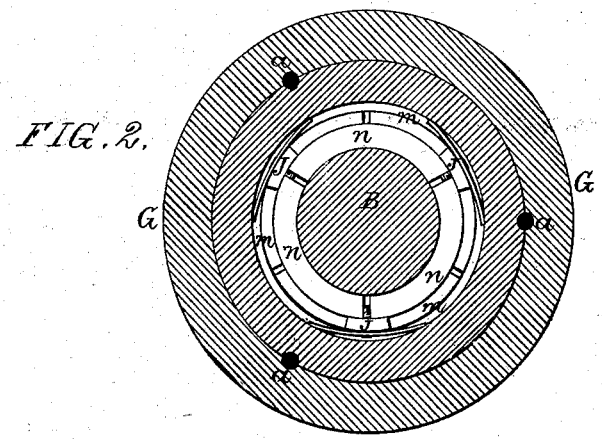
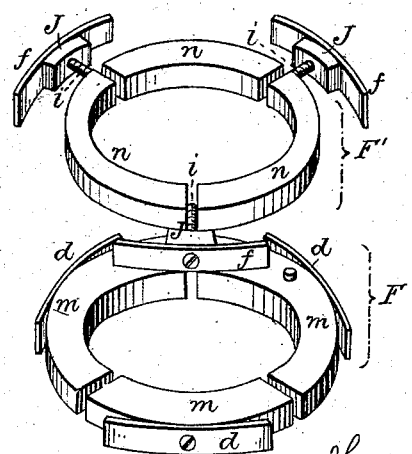
Witnesses
James F. Tobin.
Harry Smith
Inventor
Thomas Walker
by his Attorneys
Howson and Sons

UNITED STATES PATENT OFFICE.

THOMAS WALKER, OF PHILADELPHIA, PENNSYLVANIA.

STUFFING-BOX FOR STEAM-ENGINES.

SPECIFICATION forming part of Letters Patent No. 255,060, dated March 14, 1882.

Application filed January 13, 1882. (No model.)

*To all whom it may concern:*

Be it known that I, THOMAS WALKER, a citizen of the United States, residing in Philadelphia, Pennsylvania, have invented certain Improvements in Stuffing-Boxes for Steam-Engines, &c., of which the following is a specification.

This invention relates to an improvement in the stuffing-box for which Letters Patent No. 228,957 were granted to me on the 15th day of June, 1880, the object of my present improvement being to prevent leakage at the joints of the rings.

In the accompanying drawings, Figure 1 is a vertical section of a stuffing-box with my improvements; Fig. 2, a sectional plan on the line 1 2, and Fig. 3 a perspective view of one set of rings detached from the box.

A represents part of the cylinder-head of the engine; B, the piston-rod, and D the usual gland for the reception of the packing.

To the end of the gland D is adapted a recessed holder, E, for a pair of packing-rings, F F', which are confined in the holder by a recessed ring, G, to which is adapted a recessed cap, H, carrying another pair of packing-rings, F F', the cap, ring, and holder being confined together and to the end of the gland D by the usual follower-bolts, *a*, and nuts *b*. Each of the rings F is made in the present instance of three segments, *m*, and each segment is acted upon by a spring, *d*, which tends to force it firmly against the piston-rod. Each ring F' is also made in three segments, *n*, which break joints with the segments of the rings F, and are less in width than the latter, so as to provide a bearing for short segments or caps J, which close the joints between the segments *n* of the rings F', and are acted upon by the springs *f*, whereby said segments are confined to the piston-rod. These caps J serve to effectually cut off the lateral passage of steam through the joints between the segments *n*, and thus prevent leakage, and in order to maintain said caps J at all times in their proper relation to the segments, the pins or bolts *i*, whereby the springs *f* are secured to the caps, are permitted to project inward beyond the latter, and occupy the spaces between the segments *n*. The rings F are prevented from turning independently of the rings F' by providing one of the segments of each of said rings F with a pin which fits between two of the segments *n* of the rings F' above.

I claim as my invention—

1. The combination, in a stuffing-box, of a ring-holder or cap, with a pair of segmental packing-rings, F F', arranged one above the other, the ring F' being of less width than the ring F, and having its joints closed by external caps, J, which have a bearing upon said ring F, as set forth.

2. The combination of the ring-holder or cap, the segmental ring F and its springs *d*, the segmental ring F', and the caps J, with springs *f* and projecting pins or bolts *i*, as set forth.

In testimony whereof I have signed my name to this specification in the presence of two subscribing witnesses.

THOMAS WALKER.

Witnesses:
HARRY DRURY,
HARRY SMITH.